United States Patent [19]

Meray-Hovarth et al.

[11] Patent Number: 4,593,449
[45] Date of Patent: Jun. 10, 1986

[54] MANUFACTURE OF FOAM-FILLED PANELS AND CORES THEREFOR

[75] Inventors: Andrew G. Meray-Hovarth; Ricky W. Myers, both of Oakville; Robert A. A. Palmberg, Toronto, all of Canada

[73] Assignee: M.P.M. Industries Inc., Oakville, Canada

[21] Appl. No.: 617,034

[22] Filed: Jun. 4, 1984

[51] Int. Cl.⁴ .................................. H01C 1/03
[52] U.S. Cl. ........................... 29/527.1; 52/674; 52/806; 428/117
[58] Field of Search .............. 29/527.1; 52/674, 806, 52/809, 816; 264/46.6, 46.7; 428/116, 117, 118, 596

[56] References Cited

U.S. PATENT DOCUMENTS

| | | | |
|---|---|---|---|
| 447,085 | 2/1891 | Sagendorph | 52/674 |
| 514,313 | 2/1894 | Eckstein | 52/674 |
| 2,738,297 | 3/1956 | Pfistershammer | 52/806 X |
| 3,242,240 | 3/1966 | Tantlinger | |
| 3,644,158 | 2/1972 | Strumbos | |
| 3,816,573 | 6/1974 | Hashimoto | |
| 3,846,525 | 11/1974 | Kinne | |
| 3,869,778 | 3/1975 | Yancey | |
| 3,970,324 | 7/1976 | Howat | |
| 4,522,860 | 6/1985 | Scott et al. | 52/674 X |

FOREIGN PATENT DOCUMENTS 969916  7/1958  Fed. Rep. of Germany ...... 428/116

Primary Examiner—Howard N. Goldberg
Assistant Examiner—Carl J. Arbes
Attorney, Agent, or Firm—Donald E. Hewson

[57] ABSTRACT

Disclosed is a manner of making a core by shearing and bending a strip (36) of sheet metal into ribbons. The ribbons thereby constitute a series of troughs (53) and crests (52). The core is sandwiched between two skins (64,65). The crest and troughs are presented as tubes (66) extending into the interior of the core from an edge of the panel. Polyurethane foam is injected into these tubes. The foam rises and sticks the cores to the skins. The resulting panel is strong, rigid, durable, inexpensive, and extremely versatile.

11 Claims, 11 Drawing Figures

MANUFACTURE OF FOAM-FILLED PANELS AND CORES THEREFOR

This invention relates generally to cored panels, of the kind having a core sandwiched between skins. The invention is in two aspects: firstly, in a manner of making the core for such a panel; and secondly, in a manner of filling the cored panel with plastic resin foam.

PRIOR ART

It is well known in the art for panels to be made in the conventional honeycomb manner. When a honeycomb core is secured to the skins, the cells of the core are not normally connected to each other, and it is of course very difficult to fill such cells evenly with foam. A number of proposals have been made for filling the cells with plastic resin foam, as taught in U.S. Pat. No. 3,644,158, STRUMBOS, Feb. 22, 1972, for example, or in U.S. Pat. No. 1,744,042, PACE, May 01, 1956. These proposals have involved the pre-positioning of the ingredients of the foam, in liquid form, into the cells, and of then activating the foam in some manner.

Other examples of using foam and honeycomb cores between skins for various structural panels are shown in U.S. Pat. No. 3,970,324, HOWAT, July 20, 1976, and U.S. Pat. No. 3,816,573, HASHIMOTO, June 11, 1974, where the core material has holes in to permit the foam to pass from cell to cell.

Even when there is no core, the manner of applying the liquid ingredients of the foam into the space between the skins is subject to some restrictions. A problem arises if the skins are simply placed vertically parallel to each other with a space between them; if one tries to fill space with foam as if one were casting concrete. The liquid ingredients sink to the bottom of the space, and some parts of the body of foam start to cure, and become rigid, before the rest of the foam has finished expanding. This leads to the generation of very high pressures locally in the body of foam, which can cause the foam cells to become crushed, and which can cause the skins to bulge. It also leads to an uneconomical use of the foam.

U.S. Pat. No. 3,242,240, TANTLINGER, Mar. 22, 1966, shows how the liquid ingredients can be conveyed into the space between skins on a carrier member, by the expedient of using a carrier member which remains embedded in the foam after curing. U.S. Pat. No. 3,846,525, KINNE, Nov. 05, 1974, shows how the liquid ingredients can be applied layer by layer. In these two cases, the manner shown of conveying or applying the liquid ingredients could not be used if the panels were provided with cores of the honeycomb variety.

It is known from, for example, U.S. Pat. No. 3,869,778, YANCEY, Mar. 11, 1975, for a core to be not of the usual honeycomb variety, but to comprise a piece of sheet metal pierced and bent so as to form alternating crests and troughs. The skins are secured to the crests and troughs.

BRIEF DESCRIPTION OF THE INVENTION

One aspect of the present invention lies in the recognition that cores of the kind shown in YANCEY are especially suitable for use in foam-filled panels. This is because such cores present, when viewed from one edge, the appearance of openended, straight-through tubes. The liquid ingredients of the foam may be injected through nozzles into and along the tubes. The so-called tubes do not however have continuous closed walls: the walls are quite open, and allow for the easy transference of foam from tube to tube.

One of the benefits of such a foamed, cored panel is that the core does not need to be glued or welded, or otherwise secured, to the skins. The foam itself adheres both to the core and to the skins, and is quite adequate, it is recognized, in itself to secure the core and skins together. FIG. 23 of YANCEY, for example, particularly illustrates the difficulties of trying to secure the core to the skins directly, if foam is not used. On the other hand, the fixing of the core to the skins by means of foam could be strengthened and enhanced by an additional securing means, either before or after the foam is applied.

When injecting the liquid ingredients of foam into a sandwich of core and skins that is placed vertically, the method shown in KINNE might be used to avoid the difficulty referred to above of the liquid tending to settle in one place.

Preferably, however, in the invention, the sandwich is placed horizontally, and the foam is injected along the tubes from the edges.

The invention also lies in the manner of making the core itself. A pair of dies is provided, one die to go above and one to go below the sheet material from which the core is to be made. The dies each have complementary teeth; the teeth of one die exactly fit the spaces in the other die.

When the dies are brought together, material at the very edge of a tooth is cut by the shearing action between the complementary dies. Material caught on a tooth, either of the upper die or the lower die, is not cut but is moved by the tooth either downwards or upwards, respectively, away from the plane of the material, to form troughs and crests in the material.

When the dies are opened, the strip of material is indexed through the dies a sufficient distance that, after the dies have closed again, a substantial land is left between the adjacent rows of cut and bent ribbons of material.

The dies described are suited for use in a reciprocating press of conventional construction and operation. However, if desired, the same effect of sheared cuts and bent ribbons as described could be provided using rollers with the teeth formed on them, and by passing the sheet material through the nip of the rollers.

The invention lies also in the use of the particular core described above in combination with the as described injection of the liquid ingredients into the core, for it will be noted that the core as described presents a series of open tubes when viewed from one edge.

Further aspects of the invention will become apparent from the following.

DETAILED DESCRIPTION OF PREFERRED EMBODIMENTS

MAKING A CORE

Figure 1:
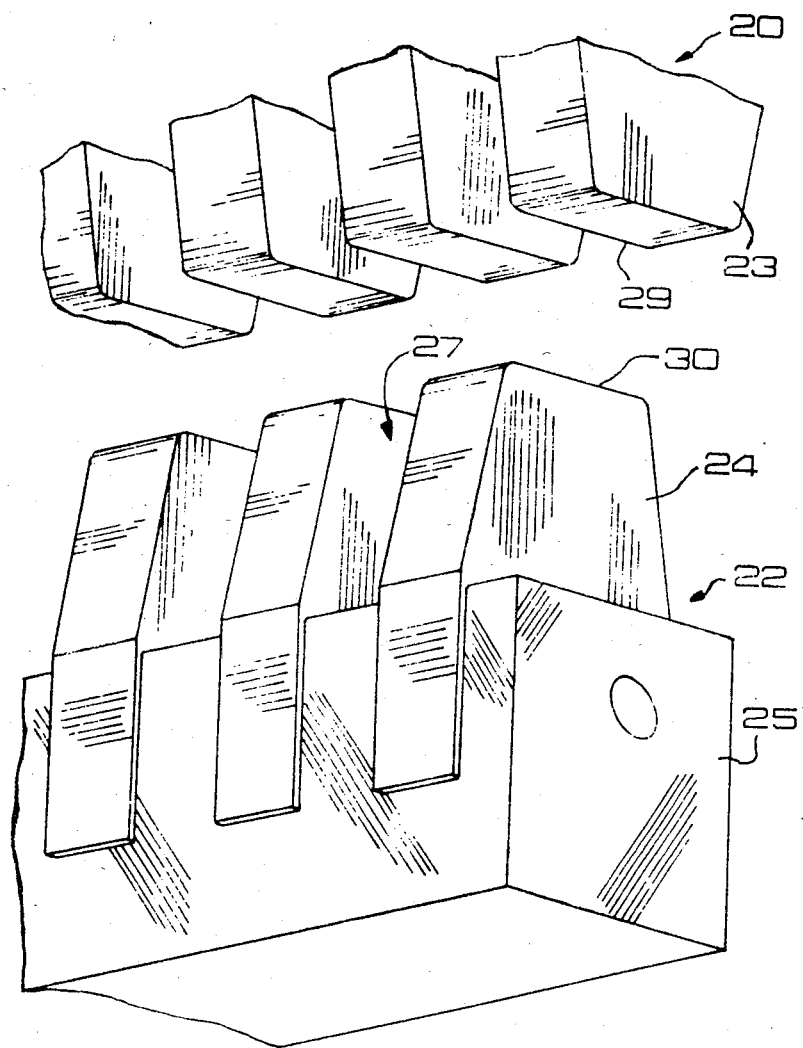
FIG. 1 is a view of a pair of dies.

FIG. 1 shows an upper die 20 and a lower die 22. Each die has respective teeth 23,24 which are fitted to respective die blocks 25.

Figure 2:
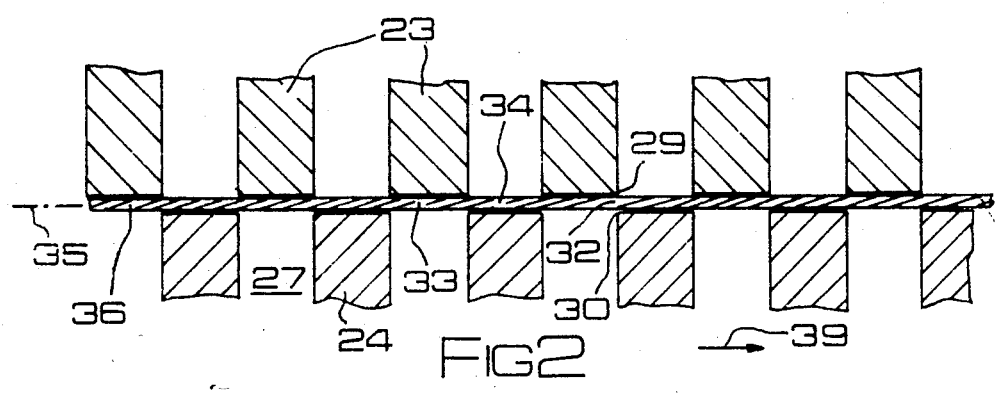
FIG. 2 and FIG. 3 are side views of the dies at different stages of closure.

The teeth 23 in the upper die 20 are arranged to fit into the spaces 27 between the teeth 24 of the lower die 22. The edges 29,30 of all the teeth, as seen in the section of FIG. 2, are sharp.

Figure 3:
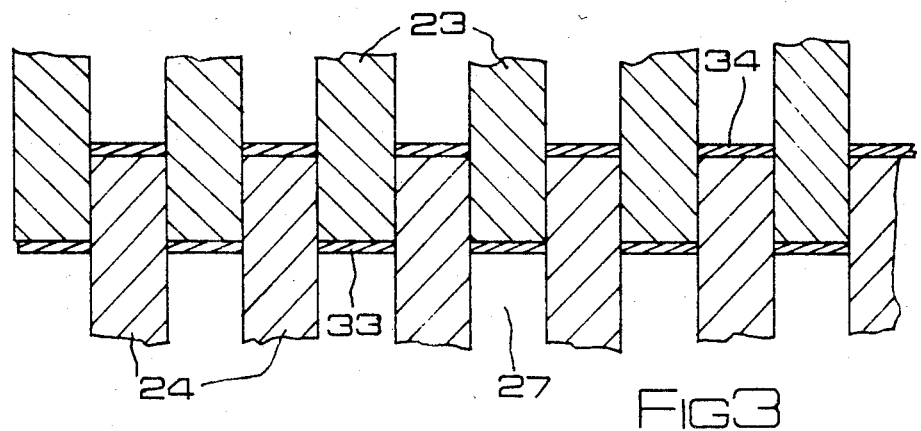
Figure 4:
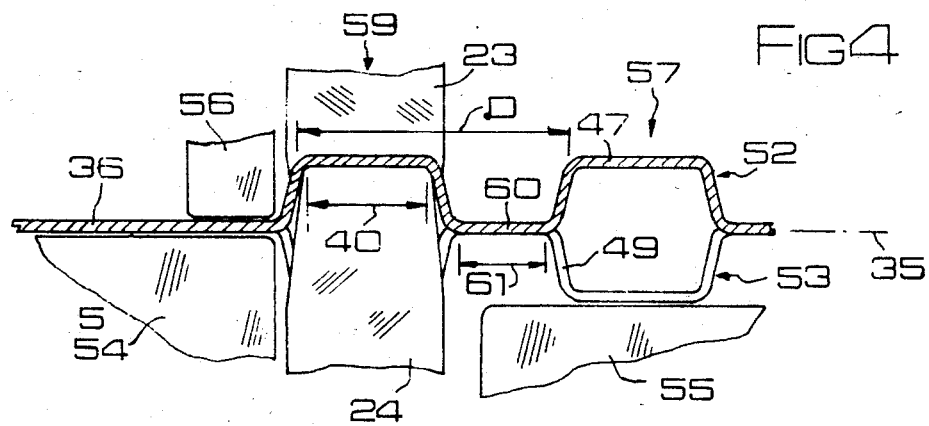
FIG. 4 is an end view of the dies, also showing a core.

FIGS. 3 and 4 show what happens when the dies 20,22 are closed. Metal 32 that is located between the edges 29,30 is cut or sheared. The metal 33 that is caught under a tooth 23 of the upper die 20 is bent downwards, and the metal 34 that is caught over a tooth 24 of the lower die 22 is bent upwards, with respect to the plane 35 of the strip 36 of sheet metal.

The metal 33,34 is not removed from the strip 36. The cuts that are made at 32 extend only in the longitudinal direction 37, not in the transverse direction 39. It should be noted that actual shearing only takes place over the longitudinal width 40 of the teeth: over the rest of the length of the cut, i.e., over that part of the length of the cut that is between the sloping portions 42,43,44,45 (see FIG. 6), the metal is torn rather than sheared. The shape of the teeth can be adjusted if the tears become unpredictable as to their extent and direction; but almost straight-sided teeth with slightly radiused corners, as shown in FIG. 4, give rise to quite adequately controlled tears in sheet steel when it is of the proportions shown.

Sloping portions 42 and 43, together with a flat portion 46, make up a ribbon 47 between a pair of cuts. The teeth 23,24 extend transversely across the strip 36, so that all the cuts are the same length and the ribbon 47 is of a rectangular shape; other shapes of ribbon may be provided if required in particular cases, by, for example, placing the dies at an angle to the transverse direction 39.

Ribbons 49, complementary to ribbons 47, are formed from the sloping portions 44,45 and the flat portion 50. The ribbons 47 form crests 52 and the ribbons 49 form troughts 53.

It will be appreciated that the cuts might alternatively be formed as a separate operation, which would be completed prior to bending the ribbons. This could be done by a punching operation which removed a thin piece of metal along the line of the cut. In the method described above however, only one closure of the dies is required to effect both the shearing and the bending of the metal. The cuts are nominally of zero width in that no metal is removed. No scrap is produced. The operation is very efficient as to time taken, and as to the load capacity needed of the press in which the dies are mounted.

After closure, the dies are opened, and the strip 36 is stripped off the teeth 23,24. The strip 36 is indexed longitudinally forwards between the dies. Tables 54,55 support the strip 36 in its passage through the press, and the bar 56 serves to hold the strip in its plane 35.

As shown, the strip 36 is held in the plane 35 and the upper and lower dies 20,22 are set to push the metal up or down by equal amounts, for symmetry. It might be arranged that the plane 35 were not symmetrically disposed, in that the crests 52 and the roots 53 might be different distances away from the plane 35, to the extent, indeed, that the plane 35 might coincide with the level either of the crests 52 or the roots 53.

Between closures, the strip is indexed sufficiently far that the originally formed row 57 of ribbons, and the succeeding row 59, are spaced apart the distance D as shown. This spacing ensures the presence of a flat land 60, between the rows, which has a width 61 measured in the longitudinal direction; the land 60 extends transversely right across the strip 36.

As shown, the rows 57,59 are not staggered in the transverse sense, i.e., the crests 52 in one row 57 are directly in line with the crests in the next row 59. However, if the press were of the kind that permitted transverse movement of the dies between closures, the crests 52 in one row 57 could for example, be aligned with the troughts 53 in the next row 59.

The shearing/bending operation described above is suitable for use with a press of the conventional reciprocating type. Alternatively, the operation could be carried out using rollers. A roller would be as long as the desired transverse width of the strip, and would have several rows of teeth around its circumference. A complementary roller would have spaces meshing with the teeth of the first roller. A strip passed through the nip of the rollers would be sheared and bent in the same manner as desribed. Even less force would be needed to shear the cuts than with the reciprocating press, because the shearing would be progressive. However, the reciprocating operation can be carried out at sufficient speed and efficiency for most requirements.

Figure 5:
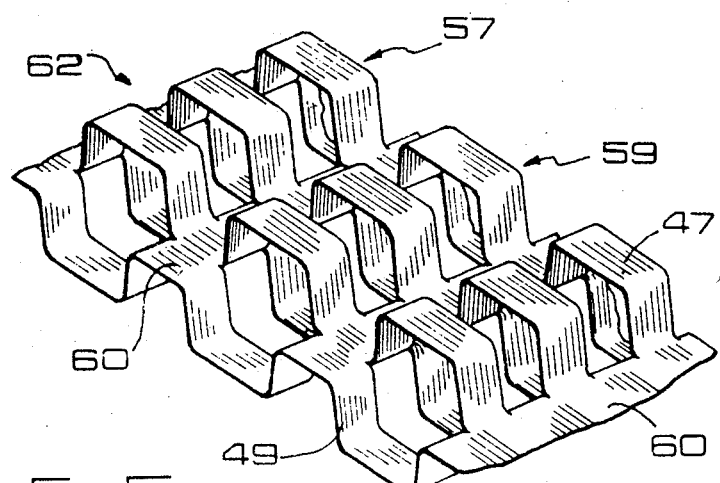
FIG. 5 is a view of a core.

The strip 36 becomes the core 62 shown in FIG. 5 after the shearing and bending operations desribed have been carried out. The shapes of the crests 52 and the roots 54 are mutually the same, but different shapes could be provided if required. The core might be curved in the transverse or longitudinal sense; or in both senses, since compound curves are easy to produce in the core shown. Even if the core is made straight as shown in FIG. 5, it is easy to bend it later to a compoundedly-curved shape of some intricacy.

MAKING A PANEL

To form a panel 63, the core 62 is sandwiched between two skins 64,65.

The core 62 may be secured to the skins by applying respective layers of glue to the upper surface of the bottom skin 64, and to the lower surface of the top skin 65, and by squeezing the skins onto the core 62 while the glue sets. The flat portions 46,50 of the ribbons should be long, if this glueing method is being used, to ensure a good area of contact of the glue. Alternatively, the core could be welded to the skins, or riveted. The skins 64,65 may be flat or may have a simple or compound curved shape as previously described. The skins should preferably be the same distance apart over the whole panel, although some variation in panel thickness can be provided simply by pressing the skins together harder in local areas. Alternatively, the core could be manufactured (though not so simply) with the crests or the troughts of varying heights, to provide a panel of varying thickness.

Figure 6:
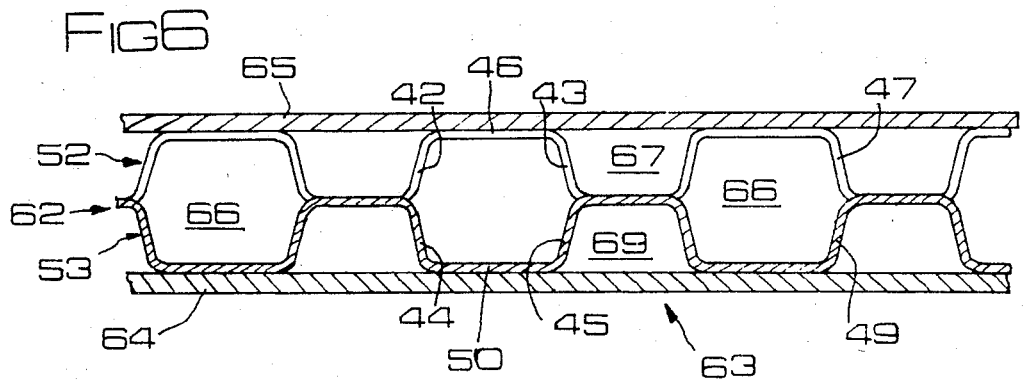
FIG. 6 is a view of a panel, looking transversely from a longitudinal edge of the panel.

As may be seen in FIG. 6, when the core 63 is viewed in the transverse direction 39 (i.e., from one of its edges that are parallel to the longitudinal direction 37) the core 62 presents the appearance of a series of tubes 66. The roof of such a tube comprises crests 52, and the floor of the tube 66 comprises the troughts 53. The tube 66 extends into the body of the panel 63 from the longitudinal edge, and indeed extends right through the panel from edge to edge.

The tube 66 is not closed, in that the walls of the tube are open to the respective channels 67,69 above and below a land 60, and to the skins 64,65. In fact, in combination with the skins, the channels 67,69 themselves also form tubes that are open at the longitudinal edges of the sandwich.

INJECTING FOAM

Figure 7:
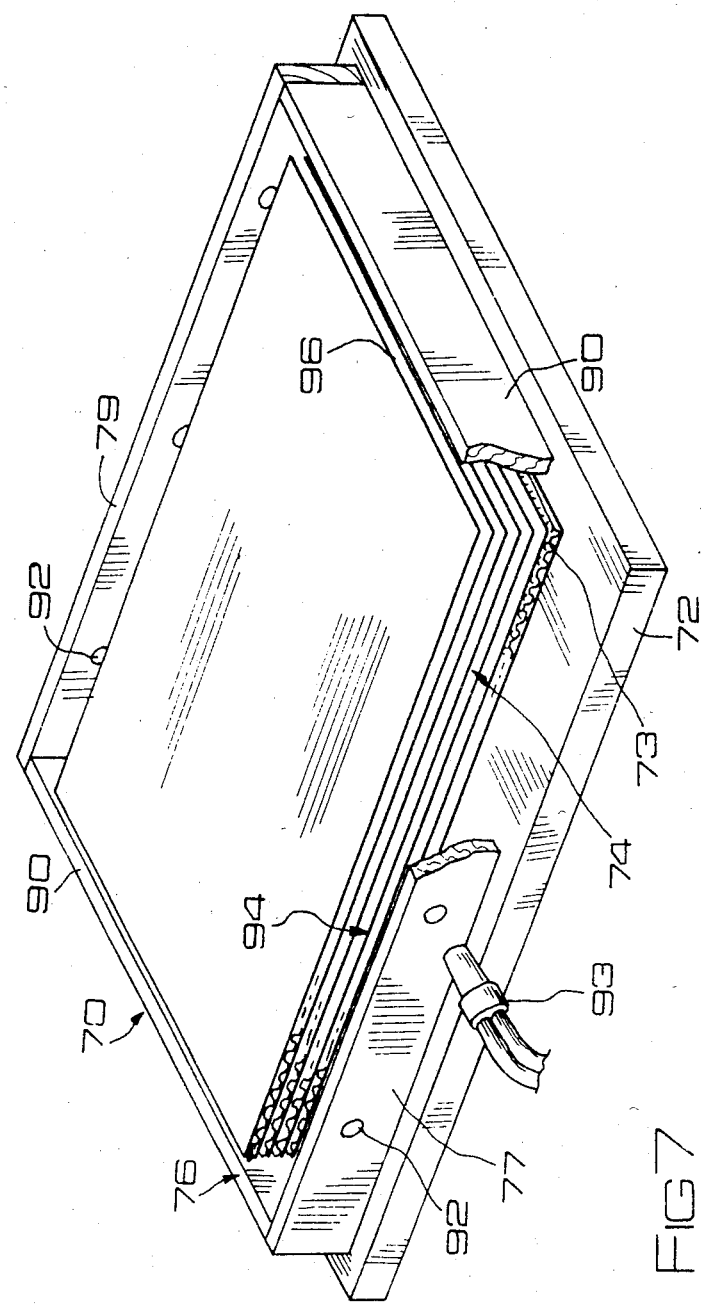
FIG. 7 is a view of apparatus for injecting foam into sandwiches.

In the other aspect of the invention, foam is injected into the tubes 66, and into the channels 67,69 which also constitute tubes. The injection is carried out using the apparatus shown in FIG. 7.

The apparatus 70 includes a flat support plate 72. Onto this, a bottom skin 64 is placed. A core 62 is placed on the bottom skin 64 and a top skin 65 onto the core 62, to form a first sandwich 73. Several more sandwiches are similarly assembled, the whole being built up to form a stack 74 of sandwiches.

A fence 76 is assembled around the stack 74. The fence includes front and back boards 77,79 and side-boards 90. The front and back boards each have holes 92. The holes 92 are for receiving nozzles 93 through which the liquid foam is to be injected into the sandwiches. The nozzles 93 are coupled to storage vessels and suitable conduits which, in accordance with normal foam injection practice, are set up so as to minimise the effects of the foam starting to cure in the conduits.

A flat clamp plate (not shown) is placed on top of the stack 74, and its surrounding fence 76 and the clamp plate and the support plate 72 are clamped together onto the fence 76. The fence is slightly less high than the nominal height of the stack 74, so that the crests 52 and troughs 53 of the cores are clamped into firm contact with the respective skins.

The nozzles 93 are placed in the holes 92, and the liquid ingredients of polyurethane foam are injected into the stack. The nozzles are then withdrawn, so that the holes 92 can act as vents. Since the skins are horizontal the liquid tends to spread out, and not to settle at any particular place. Once the liquid starts to foam, the foam can spread evenly in all directions through the open tubes 66 of the core 62. There is little tendency to the formation of local pockets of foam at different cure-stages, which, as mentioned, could lead to damage to the foam.

The described manner of filling the sandwiches with foam can result in homogeneously foamed panels, and economical use of the foam materials. These characteristics depend on the size and spacing of the nozzles, the distance apart of the skins, the overall size of the panel, and the height of the stack; and upon the ambient temperature and the mix of the ingredients. The ingredients of foam can be prepared so as to give a fast or slow foam-rise-time; to give a very sticky or a not so sticky foam; and other parameters can be varied. All these matters are within the competence of a person skilled in the art of foam injection, who will know that some experimentaton is necessary with a given panel configuration before the best combination can be found which will provide the most homogeneous foaming of the panel.

An aspect of foam technology that is particularly important is that of temperature. The panel described has a good deal of metal exposed to the foam, being metal not only of the skins but of the core too. It has been found that the core, the skins, and indeed the metal parts of the press in contact with the skins, should all be brought to about the same temperature as that of the foam. Otherwise, the foam does not flow or expand properly. It has been found that the most reliable foaming occurs when the foam, and the metal components, are in the 35 to 40 degrees C. region. The density of the foam can be varied, by, for example, altering the injection pressure of the foam, or the quantity injected. Dense foam is stronger and more rigid: less dense foam is lighter.

When the foam has cured and set, the fence 76 is removed. A space 94 was left between the stack 74 and the front board 77, to ensure that there was no pressure build up in the foam at the edge of the panel, and the space 94 is filled with foam. Such excess foam is trimmed from the stack 74, simply by cutting it off. There is a corresponding layer of excess foam between the other longitudinal edge of the stack and the backboard 79 (foam was injected by nozzles also through holes in the backboard 79). At a transverse edge 96 of the stack, the side-board 90 was much closer, and of course no foam was injected into that edge because the cores are closed when viewed from that edge. The edge 96 allows substantially no access whereby injected foam could enter the core. Whatever foam remains at an edge 96 again is removed by simply cutting it off.

Figure 8:
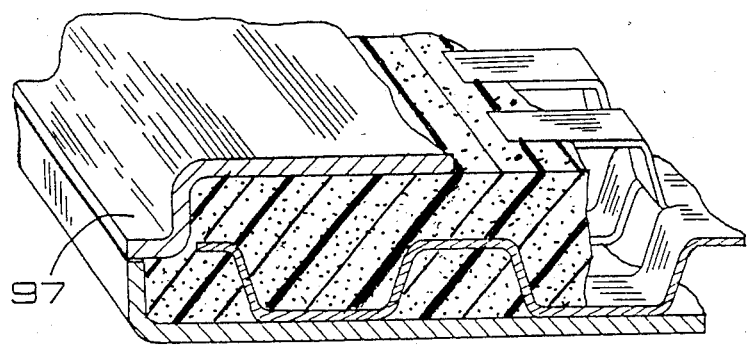
FIG. 8 is a view, partially cut away, of a panel.

Since the transverse edges are closed in this manner, the skins may be shaped to provide, for example, a channel or a lip 97 as is illustrated in FIG. 8. The longitudinal edges cannot hae such formations but must, in the invention, be open to receive the injected foam.

It will be noted that when making the cores, the metal must be shaped into crests and troughs right up to its edges, so that the core does not restrict the flow of the incoming injected liquid.

Separation of the foamed panels is made easier if the skins are lightly greased on their outside surfaces. Similarly, the components of the fence should be greased, since polyurethane foam will not stick in the presence of grease. Naturally, the cores and the inside surfaces of the skins should be scrupulously free of grease and other contaminants.

CHARACTERISTICS AND USES OF FOAMED PANELS

Panels that have the core and the homogeneous foam filling as described above offer a combination of strength, rigidity, lightness, durability, versatility and economy that has not been possible with panels known hitherto. As an example, the rear doors of box-bodies on trucks conventionally have been made of metal-faced plywood. Such doors made in the cured and foamed manner described above are better in substantially every aspect of performance and life, yet can be initially less expensive than plywood doors.

With regard to the ease with which foam may be injected into the sandwich, it is important that the core present as little obstruction as possible to the free entry of the liquid ingredients, and to the free spreading of the ingredients, once they are in; and of the foam, once it starts to rise. When the core is of sheet material, only the thickness of the material should be presented in the direction from which the liquid is injected. If, instead of just the thickness, a surface of the material is presented, then that surface will deflect the incoming liquid. The liquid would tend to settle more at the edges of the panel, to the detriment of the centre of the panel.

The core could alternatively be of wire lattice, or it could be moulded in plastic. In any case the interior should be accessible from the edges, and the injected foam should be able to permeate throughout the core.

With regard to the strength of the panel, it should be noted that foam has little strength in itself. The foam contributes only to the rigidity of the panel, which it enhances because of its bulk. On the other hand the foam is rendered somewhat more able to contribute to the resistance to crushing of the panel than might be expected, for this reason. The bubbles or cells in foams tend to be egg-shaped, with the long axes of the bubbles predominantly aligned vertically, providing the foam was allowed to rise in a reasonably unrestricted and well-vented manner. A cell of that shape can resist crushing along its long axis to a much greater extent than along one of its shorter axes. The long axes of the foam cells, which tend to be vertical, are in the above described panel, aligned in the direction where the cells will most favourably contribute to the crush strength, i.e. across the thickness of the panel.

Most of the strength, as opposed to the rigidity, of the panel, though, comes from the core. The sloping portions 42,43,44,45 should be nearly at right angles to the skins for good crush-strength, but should be inclined at a substantial angle for good shear strength. The kind of angle obtained from the shearing and tearing manner of producing the cuts, as described, is a very good compromise angle.

Not only is the foam material not very strong, but it is also brittle. It is important therefore that the core should be such as to promote a good shape to the foam. The foam should preferably be of a chunky shape throughout the panel. It should not take the form of lumps held together by relatively thin connections. In this regard, it will be noted that the asdescribed core provides a foam-shape that is nowhere thin, but is uniformly chunky, whether in the tube 66, in the channel above 67 or below 69 the land 60, or in the transition between the two, or indeed anywhere. This aspect might be contrasted with the core shape that would be produced for example if the core shown in the YANCY reference mentioned above were used. Here, there is nothing corresponding to the land 60. Hence there will be a narrow gap for the foam to pass through, between tubes. If the panel flexes, or is subject to vibration, such a thin narrow section of foam will soon crack and the foam will, in time, break up into a series of plugs, one in each tube, that are substantially not connected with each other. This will be especially the case if the walls of the tube are brought nearly at right angles to the skins for good crush-strength. Once the foam has started to crack, rigidity is lost and then more flexure is permitted, so that the effect tends to snow-ball. With the core described herein, however, the connections between all portions of the foam are thick and chunky,, not thin and subject to cracking. Such chunkiness arises from the wide access space between the tubes and the channels. The wide access space also provides little restriction to the free passage of liquids, and of the foam itself as it rises. Thus, the provision of the lands 60, of substantial width, contributes greatly to the ease of manufacture and to the durability of the foamed panel.

As mentioned above, the core might be moulded in plastic, or be formed of plastic sheet. The skins too could be of plastic, such as the familiar glass fibre reinforced resin kind of plastic material. Polyurethane foam breaks up if exposed to ultra-violet light and the skin material should be opaque if there is a danger of such exposure. When the skins are of plastic the panel has good heat insulative properties, though not of course as much strength as it had when the skins and core were made of metal. On the other hand, metal skins and cores can be used on panels that are to have insulative properties if the core is spaced from the skins, and does not touch the skins. This can be achieved by resting the cores and skins on appropriately located spacers, of plastic, during foaming.

Figure 9:
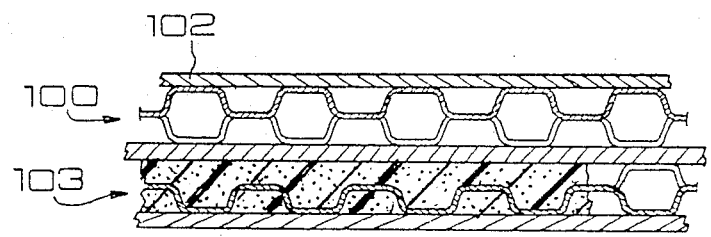
FIG. 9 is an end view of another panel.

The panels may be provided with pipes or wires embedded into the panel, and running along the tubes of the core. This can be done whether the panel is foamed or not. Furthermore, a sandwich could be made which comprises three skins and two cores, as shown in FIG. 9. One of the cores 100 is not injected with foam (by being masked during injection, or by being aligned at right angles to the direction of injection, for example).

The resulting composite panel could be used for example to convey hot (or cold) air along the unfoamed core 100 to heat or cool the skin 102, while the foamed core 103 acts to provide structural strength and rigidity. The foamed portion might alternatively be insulative if made of the appropriate materials.

The core 62 should preferably occupy the whole area of the panel 63. The core 62 need not be in one piece however, so that the dies 20,22 need not be as wide as the panel. The core can be in several strips with virtually no loss of strength or rigidity.

The foamed, cored panel may be through-drilled to provide a bolt-hole, for fixing door hinges for example. Such a hole may allow water to come in contact with the core, even if the bolt is well-tightened. Water would cause a rapid deterioration of the core if the core were made of wood, but wate has no effect on polyurethane foam.

The core and panel of the invention can be used in many different ways. The shape of a foamed panel is limited by the requirement that the foam has to be injected from an edge along unobstructed tubes. Within that limitation, though, the cross-section of the panel can be of any shape: it could be an annulus for example, so that the finished product is itself a hollow tube. The panel could follow a compound curve, such as that, for example, of a boat hull.

As to the core itself, normally it will be used between skins in the manner described. However, the core could be used without skins, for instance as reinforcement for cast concrete. In some applications, concrete is formed over a wire-mesh reinforcing base, and the concrete has a very thin wall-thickness. The core of the invention could be used to define that thickness, by casting the concrete over the core, and later removing the concrete down to the core. Thus the use of the core as a structural framework is not confined to its use between skins.

We claim:

1. Method of making a foamed, cored panel, the method comprising the steps:
    of forming a sandwich of two skins (64,65) and a core (62) placed between the skins;
    where the sandwich has these characteristics;
    that the core is so shaped and arranged with respect to the skins that when viewed from an edge of the panel the sandwich presents the appearance of a series of open-ended, straight-through tubes (66);
    that the walls of such a tube are not closed or continuous but are provided with many openings along the length of the tube;

that the openings are of such a size, position, and nature, that the tube is substantially open to neighbouring tubes and to the skins;

of injecting, into the tubes thus presented, the ingredients of plastic foam in liquid form;

of causing the ingredients to foam and to substantially fill the tubes and all spaces between the skins, and to adhere to the core and to the skins;

and of allowing the foam to cure and become hard.

2. Method of claim 1 where the sandwich is further characterized in that the skins are not attached to the core prior to injection of the foam.

3. Method of claim 1, including the step of clamping the sandwich in a press during injection and curing of the foam.

4. Method of claim 1, including the step of placing the skins in a substantially horizontal plane during injection and curing of the foam.

5. Method of claim 1, where the sandwich is further characterized in that the core has the further characteristics that when viewed from another edge (97) of the panel which is at right angles to the said edge, the sandwich presents an appearance of being substantially closed, such that a liquid injected from the said other edge would not, in substance, pass into the core.

6. Method of claim 1, including the step of injecting the liquid through a number of spaced nozzles (93) which are arranged around the perimeter of the sandwich, where the alignment of the nozzles is such that each directs a spray of liquid into and along the tubes (66).

7. Method of claim 6, including the step of arranging several sandwiches with their respective tubes (66) parallel with each other, and where the nozzles are set to direct the liquid into the tubes of all the sandwiches, so that several panels are made at the same time.

8. Method of claim 1, for making several panels at the same time, comprising the steps:

of laying a bottom skin (64) on a flat horizontal support plate (72);

of resting a core (62) on the bottom skin;

of resting a top skin (65) on the core, to form a first sandwich (73);

of building up a stack (74) of sandwiches one on top of another on the support plate;

of providing a fence (76) around the perimeter of the sandwiches;

of providing a clamp plate on top of the stack;

of clamping the clamp plate and the support plate together onto the fence;

of providing holes (92) in the fence at suitable intervals to receive injection nozzles (93);

and of maintaining the clamp force during foaming and curing of the foam.

9. Method of claim 8, including the step of withdrawing the nozzles from the holes straight after injection to leave the holes free to act as vents.

10. Method of claim 8, including the step of placing the fence so that its height is slightly less than the total height of the stack, in order that the stack is slightly compressed when the plates are clamped together.

11. Method of claim 1, where the sandwich is further characterized in that the core is made of sheet material, which is so disposed that when the sandwich is viewed from the said edge, only the thickness of the sheet is visible, no part of the face of the sheet being visible in that view.

* * * * *